United States Patent
Peterson

(10) Patent No.: US 12,115,918 B2
(45) Date of Patent: Oct. 15, 2024

(54) VEHICULAR TRAILERING ASSIST SYSTEM WITH AUXILIARY SIDE TRAILER CAMERAS

(71) Applicant: Magna Mirrors of America, Inc., Holland, MI (US)

(72) Inventor: Eric Peterson, West Olive, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 80 days.

(21) Appl. No.: 18/161,189

(22) Filed: Jan. 30, 2023

(65) Prior Publication Data

US 2023/0242038 A1    Aug. 3, 2023

Related U.S. Application Data

(60) Provisional application No. 63/267,329, filed on Jan. 31, 2022.

(51) Int. Cl.

| | |
|---|---|
| *B60R 1/25* | (2022.01) |
| *B60R 1/26* | (2022.01) |
| *B60R 1/28* | (2022.01) |
| *B60R 11/04* | (2006.01) |
| *H04N 5/268* | (2006.01) |
| *H04N 7/18* | (2006.01) |
| *H04N 23/82* | (2023.01) |

(52) U.S. Cl.
CPC ............. *B60R 1/25* (2022.01); *B60R 1/26* (2022.01); *B60R 1/28* (2022.01); *B60R 11/04* (2013.01); *H04N 5/268* (2013.01); *H04N 7/181* (2013.01); *H04N 23/82* (2023.01); *B60R 2300/105* (2013.01); *B60R 2300/20* (2013.01); *B60R 2300/303* (2013.01); *B60R 2300/802* (2013.01)

(58) Field of Classification Search
CPC .......... H04N 7/181; H04N 7/18; H04N 23/82; H04N 5/268; B60R 1/25; B60R 1/26; B60R 1/28; B60R 11/04; B60R 2300/105; B60R 2300/20; B60R 2300/303; B60R 2300/802
USPC ................................. 348/148, 143, 153, 159
See application file for complete search history.

(56) References Cited

U.S. PATENT DOCUMENTS

| | | |
|---|---|---|
| 4,546,551 A | 10/1985 | Franks |
| 4,953,305 A | 9/1990 | Van Lente et al. |
| 5,530,240 A | 6/1996 | Larson et al. |
| 5,550,677 A | 8/1996 | Schofield et al. |
| 5,576,687 A | 11/1996 | Blank et al. |

(Continued)

*Primary Examiner* — Sherrie Hsia
(74) *Attorney, Agent, or Firm* — HONIGMAN LLP

(57) ABSTRACT

A vehicular vision system includes a plurality of vehicle cameras disposed at a vehicle, a trailer camera disposed at a trailer, and a video display screen disposed at the vehicle and viewable by a driver of the vehicle. When the trailer is hitched to the vehicle, the trailer camera captures image data and provides captured image data to an electronic control unit (ECU). The plurality of vehicle cameras capture image data and provide captured image data to the ECU. An auxiliary camera is detachably attached at an exterior side portion of the trailer. With the auxiliary camera detachably attached at the exterior side portion of the trailer and during a reversing maneuver of the vehicle with the trailer hitched to the vehicle, and responsive to a user input, video images derived from the image data captured by the auxiliary camera are displayed for viewing by the driver of the vehicle.

28 Claims, 9 Drawing Sheets

(56) References Cited

U.S. PATENT DOCUMENTS

| | | |
|---|---|---|
| 5,632,092 A | 5/1997 | Blank et al. |
| 5,668,663 A | 9/1997 | Varaprasad et al. |
| 5,670,935 A | 9/1997 | Schofield et al. |
| 5,699,044 A | 12/1997 | Van Lente et al. |
| 5,708,410 A | 1/1998 | Blank et al. |
| 5,724,187 A | 3/1998 | Varaprasad et al. |
| 5,737,226 A | 4/1998 | Olson et al. |
| 5,760,962 A | 6/1998 | Schofield et al. |
| 5,786,772 A | 7/1998 | Schofield et al. |
| 5,796,094 A | 8/1998 | Schofield et al. |
| 5,802,727 A | 9/1998 | Blank et al. |
| 5,877,897 A | 3/1999 | Schofield et al. |
| 5,878,370 A | 3/1999 | Olson |
| 5,929,786 A | 7/1999 | Schofield et al. |
| 5,949,331 A | 9/1999 | Schofield et al. |
| 6,087,953 A | 7/2000 | DeLine et al. |
| 6,173,501 B1 | 1/2001 | Blank et al. |
| 6,201,642 B1 | 3/2001 | Bos |
| 6,222,447 B1 | 4/2001 | Schofield et al. |
| 6,222,460 B1 | 4/2001 | DeLine et al. |
| 6,302,545 B1 | 10/2001 | Schofield et al. |
| 6,329,925 B1 | 12/2001 | Skiver et al. |
| 6,396,397 B1 | 5/2002 | Bos et al. |
| 6,498,620 B2 | 12/2002 | Schofield et al. |
| 6,513,252 B1 | 2/2003 | Schierbeek et al. |
| 6,523,964 B2 | 2/2003 | Schofield et al. |
| 6,611,202 B2 | 8/2003 | Schofield et al. |
| 6,636,258 B2 | 10/2003 | Strumolo |
| 6,642,851 B2 | 11/2003 | Deline et al. |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 | 5/2005 | Schofield et al. |
| 6,946,978 B2 | 9/2005 | Schofield |
| 7,004,593 B2 | 2/2006 | Weller et al. |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,184,190 B2 | 2/2007 | McCabe et al. |
| 7,195,381 B2 | 3/2007 | Lynam et al. |
| 7,230,640 B2 | 6/2007 | Regensburger et al. |
| 7,248,283 B2 | 7/2007 | Takagi et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,295,229 B2 | 11/2007 | Kumata et al. |
| 7,301,466 B2 | 11/2007 | Asai |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,446,650 B2 | 11/2008 | Scholfield et al. |
| 7,581,859 B2 | 9/2009 | Lynam |
| 7,592,928 B2 | 9/2009 | Chinomi et al. |
| 7,626,749 B2 | 12/2009 | Baur et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 8,694,224 B2 | 4/2014 | Chundrlik, Jr. et al. |
| 8,818,042 B2 | 8/2014 | Schofield et al. |
| 8,886,401 B2 | 11/2014 | Schofield et al. |
| 8,917,169 B2 | 12/2014 | Schofield et al. |
| 9,036,026 B2 | 5/2015 | Dellantoni et al. |
| 9,068,390 B2 | 6/2015 | Ihlenburg et al. |
| 9,077,098 B2 | 7/2015 | Latunski |
| 9,077,962 B2 | 7/2015 | Shi et al. |
| 9,085,261 B2 | 7/2015 | Lu et al. |
| 9,090,234 B2 | 7/2015 | Johnson et al. |
| 9,092,986 B2 | 7/2015 | Salomonsson et al. |
| 9,126,525 B2 | 9/2015 | Lynam et al. |
| 9,140,789 B2 | 9/2015 | Lynam |
| 9,146,898 B2 | 9/2015 | Ihlenburg et al. |
| 9,174,574 B2 | 11/2015 | Salomonsson |
| 9,205,776 B2 | 12/2015 | Turk |
| 9,233,641 B2 | 1/2016 | Sesti et al. |
| 9,446,713 B2 | 9/2016 | Lu et al. |
| 9,558,409 B2 | 1/2017 | Pliefke et al. |
| 9,609,757 B2 | 3/2017 | Steigerwald |
| 9,900,490 B2 | 2/2018 | Ihlenburg et al. |
| 9,914,333 B2 | 3/2018 | Shank et al. |
| 10,046,706 B2 | 8/2018 | Larson et al. |
| 10,071,687 B2 | 9/2018 | Ihlenburg et al. |
| 10,086,870 B2 | 10/2018 | Gieseke et al. |
| 10,089,537 B2 | 10/2018 | Nix et al. |
| 10,099,614 B2 | 10/2018 | Diessner |
| 10,154,185 B2 | 12/2018 | Sigle et al. |
| 10,160,382 B2 | 12/2018 | Pliefke et al. |
| 10,166,924 B2 | 1/2019 | Baur |
| 10,179,543 B2 | 1/2019 | Rathi et al. |
| 10,264,219 B2 | 4/2019 | Mleczko et al. |
| 10,313,572 B2 | 6/2019 | Wohlte |
| 10,332,002 B2 | 6/2019 | Bliss et al. |
| 10,346,705 B2 | 7/2019 | Naserian et al. |
| 10,407,047 B2 | 9/2019 | Chundrlik, Jr. et al. |
| 10,421,404 B2 | 9/2019 | Larson et al. |
| 10,442,360 B2 | 10/2019 | LaCross et al. |
| 10,452,931 B2 | 10/2019 | Gupta |
| 10,532,698 B2 | 1/2020 | Potnis et al. |
| 10,552,976 B2 | 2/2020 | Diessner et al. |
| 10,567,705 B2 | 2/2020 | Ziegenspeck et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 10,933,810 B2 | 3/2021 | Lu et al. |
| 10,948,798 B2 | 3/2021 | Lynam et al. |
| 10,967,796 B2 | 4/2021 | Uken et al. |
| 11,064,165 B2 | 7/2021 | Kiliman |
| 11,072,284 B2 | 7/2021 | Windeler et al. |
| 11,180,083 B2 | 11/2021 | Lu et al. |
| 11,410,431 B2 | 8/2022 | Pliefke et al. |
| 11,465,560 B2 | 10/2022 | Lu et al. |
| 11,465,561 B2 | 10/2022 | Peterson et al. |
| 11,634,073 B2 | 4/2023 | Ihlenburg et al. |
| 11,673,605 B2 | 6/2023 | Gieseke et al. |
| 11,702,017 B2 | 7/2023 | Gali et al. |
| 11,861,878 B2 | 1/2024 | Gali et al. |
| 11,875,575 B2 | 1/2024 | Gali et al. |
| 2006/0050018 A1 | 3/2006 | Hutzel et al. |
| 2006/0061008 A1 | 3/2006 | Karner et al. |
| 2011/0050903 A1 | 3/2011 | Vorobiev |
| 2012/0162427 A1 | 6/2012 | Lynam |
| 2013/0002873 A1 | 1/2013 | Hess |
| 2013/0141578 A1 | 6/2013 | Chundrlik, Jr. et al. |
| 2013/0215271 A1 | 8/2013 | Lu |
| 2013/0222593 A1 | 8/2013 | Byrne et al. |
| 2013/0242099 A1 | 9/2013 | Sauer et al. |
| 2013/0258077 A1 | 10/2013 | Bally et al. |
| 2013/0278769 A1 | 10/2013 | Nix et al. |
| 2013/0298866 A1 | 11/2013 | Vogelbacher |
| 2013/0300869 A1 | 11/2013 | Lu et al. |
| 2013/0314503 A1 | 11/2013 | Nix et al. |
| 2014/0005907 A1 | 1/2014 | Bajpai |
| 2014/0022390 A1 | 1/2014 | Blank et al. |
| 2014/0025240 A1 | 1/2014 | Steigerwald et al. |
| 2014/0028852 A1 | 1/2014 | Rathi |
| 2014/0049646 A1 | 2/2014 | Nix |
| 2014/0052340 A1 | 2/2014 | Bajpai |
| 2014/0067206 A1 | 3/2014 | Pflug |
| 2014/0085472 A1 | 3/2014 | Lu et al. |
| 2014/0098229 A1 | 4/2014 | Lu et al. |
| 2014/0104426 A1 | 4/2014 | Boegel et al. |
| 2014/0138140 A1 | 5/2014 | Sigle |
| 2014/0139676 A1 | 5/2014 | Wierich |
| 2014/0152825 A1 | 6/2014 | Schaffner |
| 2014/0160276 A1 | 6/2014 | Pliefke et al. |

(56) References Cited

U.S. PATENT DOCUMENTS

| | | |
|---|---|---|
| 2014/0160291 A1 | 6/2014 | Schaffner |
| 2014/0168415 A1 | 6/2014 | Ihlenburg et al. |
| 2014/0168437 A1 | 6/2014 | Rother et al. |
| 2014/0211009 A1 | 7/2014 | Fursich |
| 2014/0218535 A1 | 8/2014 | Ihlenburg et al. |
| 2014/0226012 A1 | 8/2014 | Achenbach |
| 2014/0232869 A1 | 8/2014 | May et al. |
| 2014/0247352 A1 | 9/2014 | Rathi et al. |
| 2014/0247354 A1 | 9/2014 | Knudsen |
| 2014/0247355 A1 | 9/2014 | Ihlenburg |
| 2014/0285666 A1 | 9/2014 | O'Connell et al. |
| 2014/0293042 A1 | 10/2014 | Lynam |
| 2014/0293057 A1 | 10/2014 | Wierich |
| 2014/0307095 A1 | 10/2014 | Wierich |
| 2014/0309884 A1 | 10/2014 | Wolf |
| 2014/0313339 A1 | 10/2014 | Diessner |
| 2014/0320636 A1 | 10/2014 | Bally et al. |
| 2014/0320658 A1 | 10/2014 | Pliefke |
| 2014/0327772 A1 | 11/2014 | Sahba |
| 2014/0327774 A1 | 11/2014 | Lu et al. |
| 2014/0336876 A1 | 11/2014 | Gieseke et al. |
| 2014/0340510 A1 | 11/2014 | Ihlenburg et al. |
| 2014/0347486 A1 | 11/2014 | Okouneva |
| 2015/0002670 A1 | 1/2015 | Bajpai |
| 2015/0217693 A1 | 8/2015 | Pliefke et al. |
| 2017/0050672 A1 | 2/2017 | Gieseke et al. |
| 2017/0217372 A1* | 8/2017 | Lu ................... B60R 16/027 |
| 2017/0254873 A1 | 9/2017 | Koravadi |
| 2017/0355312 A1 | 12/2017 | Habibi et al. |
| 2018/0134217 A1 | 5/2018 | Peterson et al. |
| 2018/0211528 A1 | 7/2018 | Seifert |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2018/0341823 A1 | 11/2018 | Gupta |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0047475 A1 | 2/2019 | Uken et al. |
| 2019/0064831 A1 | 2/2019 | Gali et al. |
| 2019/0118717 A1 | 4/2019 | Blank et al. |
| 2019/0118860 A1 | 4/2019 | Gali et al. |
| 2019/0143895 A1 | 5/2019 | Pliefke et al. |
| 2019/0146297 A1 | 5/2019 | Lynam et al. |
| 2019/0225152 A1 | 7/2019 | Koravadi |
| 2019/0258131 A9 | 8/2019 | Lynam et al. |
| 2019/0297233 A1 | 9/2019 | Gali et al. |
| 2019/0347825 A1 | 11/2019 | Gupta et al. |
| 2020/0017143 A1 | 1/2020 | Gali |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0377022 A1 | 12/2020 | LaCross et al. |
| 2020/0406967 A1 | 12/2020 | Yunus et al. |
| 2021/0078634 A1 | 3/2021 | Jalalmaab et al. |
| 2021/0094473 A1 | 4/2021 | Gali et al. |
| 2021/0127693 A1 | 5/2021 | Tomita et al. |
| 2021/0155167 A1 | 5/2021 | Lynam et al. |
| 2021/0162926 A1 | 6/2021 | Lu |
| 2021/0170820 A1 | 6/2021 | Zhang |
| 2021/0170947 A1 | 6/2021 | Yunus et al. |
| 2021/0213878 A1* | 7/2021 | Schondorf ............. B60R 1/002 |
| 2021/0245662 A1 | 8/2021 | Blank et al. |
| 2021/0300246 A1 | 9/2021 | Peterson et al. |
| 2022/0024391 A1 | 1/2022 | Gali et al. |
| 2022/0027644 A1 | 1/2022 | Gali et al. |
| 2022/0028111 A1 | 1/2022 | Gali et al. |
| 2022/0189052 A1 | 6/2022 | Jalalmaab et al. |
| 2022/0212599 A1 | 7/2022 | Gali et al. |
| 2022/0212668 A1 | 7/2022 | Joseph et al. |
| 2022/0215670 A1 | 7/2022 | Gali et al. |
| 2023/0001984 A1 | 1/2023 | Lu et al. |
| 2024/0064274 A1 | 2/2024 | Blank et al. |

* cited by examiner ns**

VEHICULAR TRAILERING ASSIST SYSTEM WITH AUXILIARY SIDE TRAILER CAMERAS

CROSS REFERENCE TO RELATED APPLICATION

The present application claims the filing benefits of U.S. provisional application Ser. No. 63/267,329, filed Jan. 31, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

A vehicular trailer assist system includes a plurality of vehicle cameras disposed at a vehicle equipped with the vehicular trailer assist system. The plurality of vehicle cameras includes (i) a rearward-viewing camera viewing at least rearward of the vehicle, (ii) a left-side vehicle camera disposed at a left side of the equipped vehicle and viewing at least rearward and sideward of the equipped vehicle along the left side of the equipped vehicle, and (iii) a right-side vehicle camera disposed at a right side of the equipped vehicle and viewing at least rearward and sideward of the equipped vehicle along the right side of the equipped vehicle. The vehicle cameras may include respective CMOS imaging arrays having at least one million photosensors arranged in rows and columns. The system includes an electronic control unit (ECU) with electronic circuitry and associated software. The electronic circuitry includes an image processor operable to process image data provided to the ECU. The plurality of vehicle cameras captures image data and image data captured by the plurality of vehicle cameras is provided to the ECU. A trailer camera is disposed at a rear portion of a trailer and viewing at least rearward of the trailer. With the trailer hitched to the equipped vehicle, the trailer camera captured image data and image data captured by the trailer camera is provided to the ECU. A video display screen is disposed at the equipped vehicle and viewable by a driver of the equipped vehicle. With the trailer hitched to the vehicle, one or more detachably attached cameras, such as an attachable or portable or auxiliary camera that may be selectively attached at the trailer by a user or operator of the vehicle and trailer, may be disposed at the trailer, such as at one or more respective sides of the trailer to view rearward and along the respective sides of the trailer, and the one or more auxiliary cameras may capture image data and communicate the captured image data for display at the vehicle. The auxiliary camera views at least rearward of the trailer and has a field of view that is different from a field of view of the trailer camera. During a reversing maneuver of the equipped vehicle with the trailer hitched to the equipped vehicle, video images are displayed at the video display screen, and the displayed video images are derived from image data provided to the ECU from at least one selected from the group consisting of (i) the trailer camera and (ii) at least one vehicle camera of the plurality of vehicle cameras. With the auxiliary camera detachably attached at the exterior side portion of the trailer during the reversing maneuver of the equipped vehicle with the trailer hitched to the equipped vehicle, and responsive to a user input, video images derived at least in part from image data captured by the auxiliary camera detachably attached at the exterior side portion of the trailer are displayed for viewing by the driver of the equipped vehicle. Thus, the auxiliary cameras provide views along the sides of the trailer and rearward of the trailer to aid in display of the region rearward and sideward of the trailer for the driver of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like. As discussed below, the system may display images for viewing by a driver of the vehicle, the images derived from image data captured by one or more vehicle cameras and/or one or more trailer cameras disposed at a trailer hitched to the vehicle equipped with the vision system. The system further displays images captured by one or more selectably detachably attached cameras, the one or more portable or attachable cameras disposed, for example, at respective sides of the trailer to increase the field of view of the driver when maneuvering the vehicle and trailer in a rearward direction.

Figure 1:
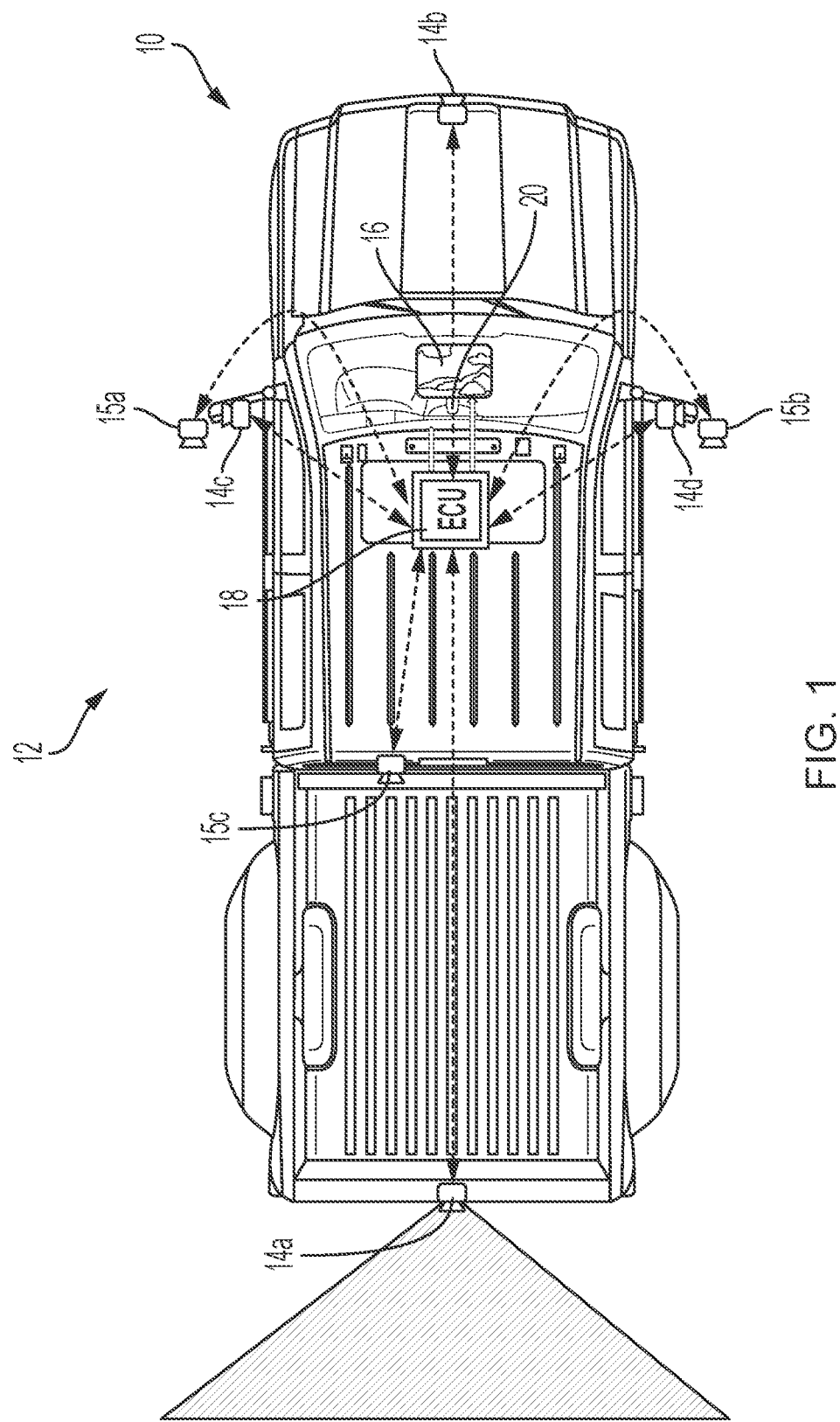
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, the system includes camera monitoring system (CMS) cameras 15a-c (including side rearward-viewing CMS cameras 15a, 15b at the respective sides of the vehicle, and a rearward-viewing camera 15c that has a different field of view than the rear backup camera 14a). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (the ECU and display device may be part of or incorporated in or at an interior rearview mirror assembly 20 of the vehicle, or the ECU and/or the display device may be disposed elsewhere at or in the vehicle such as at a center stack display device or display devices mounted at the respective A-pillars at the interior cabin of the vehicle). The data transfer or signal communication from the camera to the ECU may comprise any suitable data or communication link, such as a vehicle network bus or the like of the equipped vehicle. The system may utilize aspects of the systems described in U.S. Pat. Nos. 10,967,796; 10,948,798; 10,442,360; 10,421,404; 10,166,924 and/or 10,046,706, and/or U.S. Publication Nos. US-2021-0245662; US-2021-0162926; US-2021-0155167; US-2020-0377022; US-2019-0146297; US-2019-0118717; US-2018-0134217; US-2017-0355312 and/or US-2014-0285666, and/or International Publication No. WO 2022/150826, which are all hereby incorporated herein by reference in their entireties.

Figure 2:
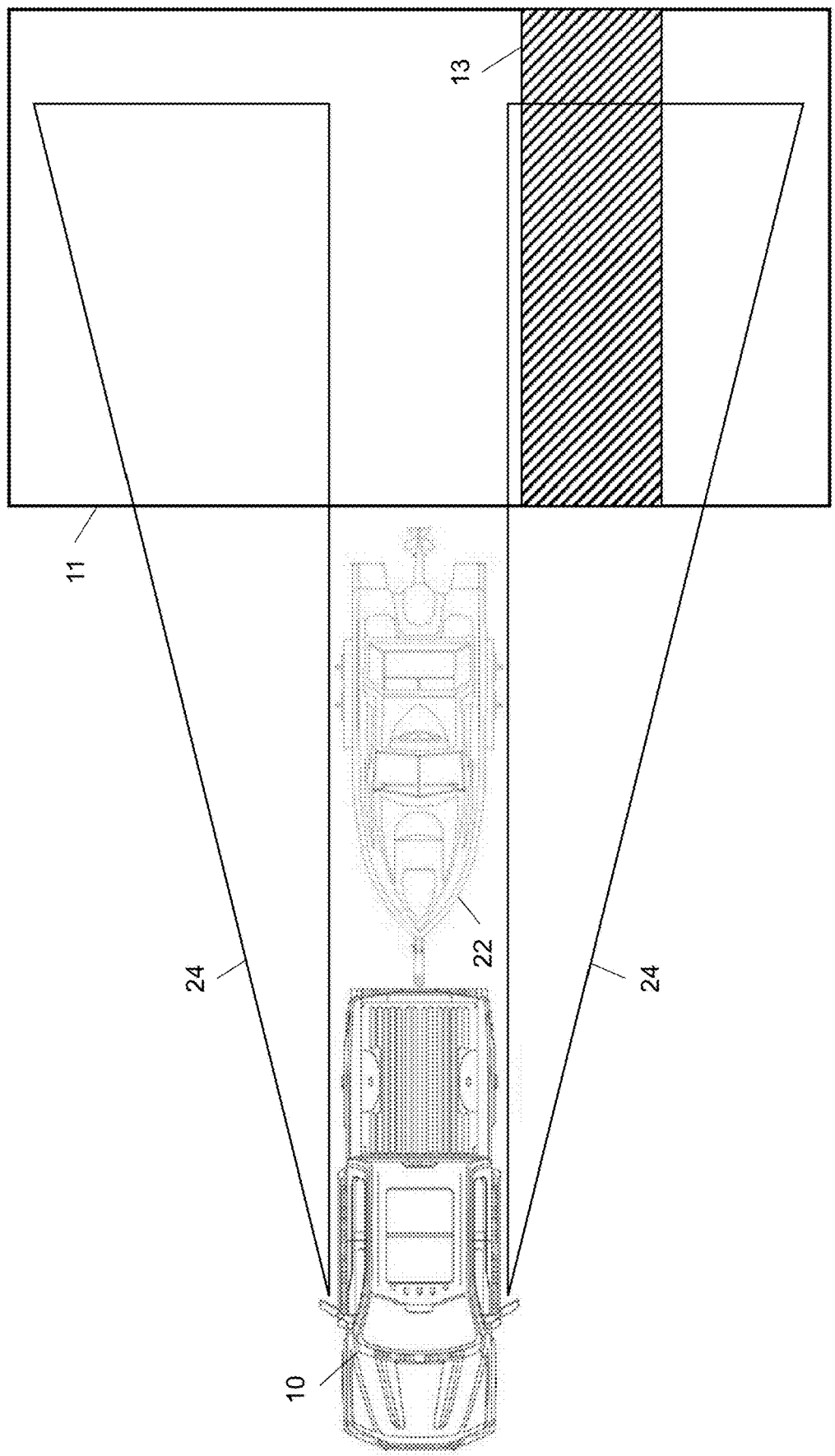
FIG. 2 shows the vehicle towing a trailer with the trailer axially aligned with the vehicle and with sideward fields of view provided to the driver of the vehicle by the exterior rearview mirrors and/or side viewing cameras of the vehicle.

As shown in FIG. 2, a driver of the vehicle 10, when driving the vehicle and towing a trailer 22 hitched to the vehicle, may be performing a reversing maneuver to move the trailer 22 into a target zone or area 11 behind the vehicle and the trailer 22. The target zone 11 may include an object or obstacle 13 that the trailer 22 should avoid when reversing into the target zone 11. For example, the trailer 22 may comprise a boat trailer carrying a boat and the target zone 11 may comprise a boat ramp with a dock 13 disposed along the side of the boat ramp 11. Thus, in the illustrated example, the driver may be performing a reversing maneuver with the vehicle 10 to move the trailer 22 rearward and position the trailer 22 along the boat ramp 11 and next to the dock 13. The vision system 12 (and optionally the interior and exterior rearview mirrors of the vehicle) provide views to the driver of the vehicle to aid the driver in maneuvering the vehicle to position the trailer 22.

The vision system 12 provides sideward fields of view 24 that are rearward of the vehicle 10 and along the respective sides of the vehicle 10. The sideward fields of view 24 may be provided by one or more of the exterior rearview mirrors of the vehicle, the sideward/rearward cameras 14c, 14d, and/or the side rearward CMS cameras 15a, 15d. FIG. 2 depicts the sideward fields of view 24 when the vehicle 10 and trailer 22 are centrally aligned (i.e., respective longitudinal axes of the vehicle and trailer are aligned or parallel with one another) and the driver is viewing rearward using only the exterior rearview mirrors and/or the side and rear viewing cameras. As shown, the driver in this situation views the obstacle 13 (e.g., the dock at the boat ramp), but may not view the trailer 22 and thus may have difficulty judging a distance or position of the trailer 22 relative to the dock 13.

Figure 3:
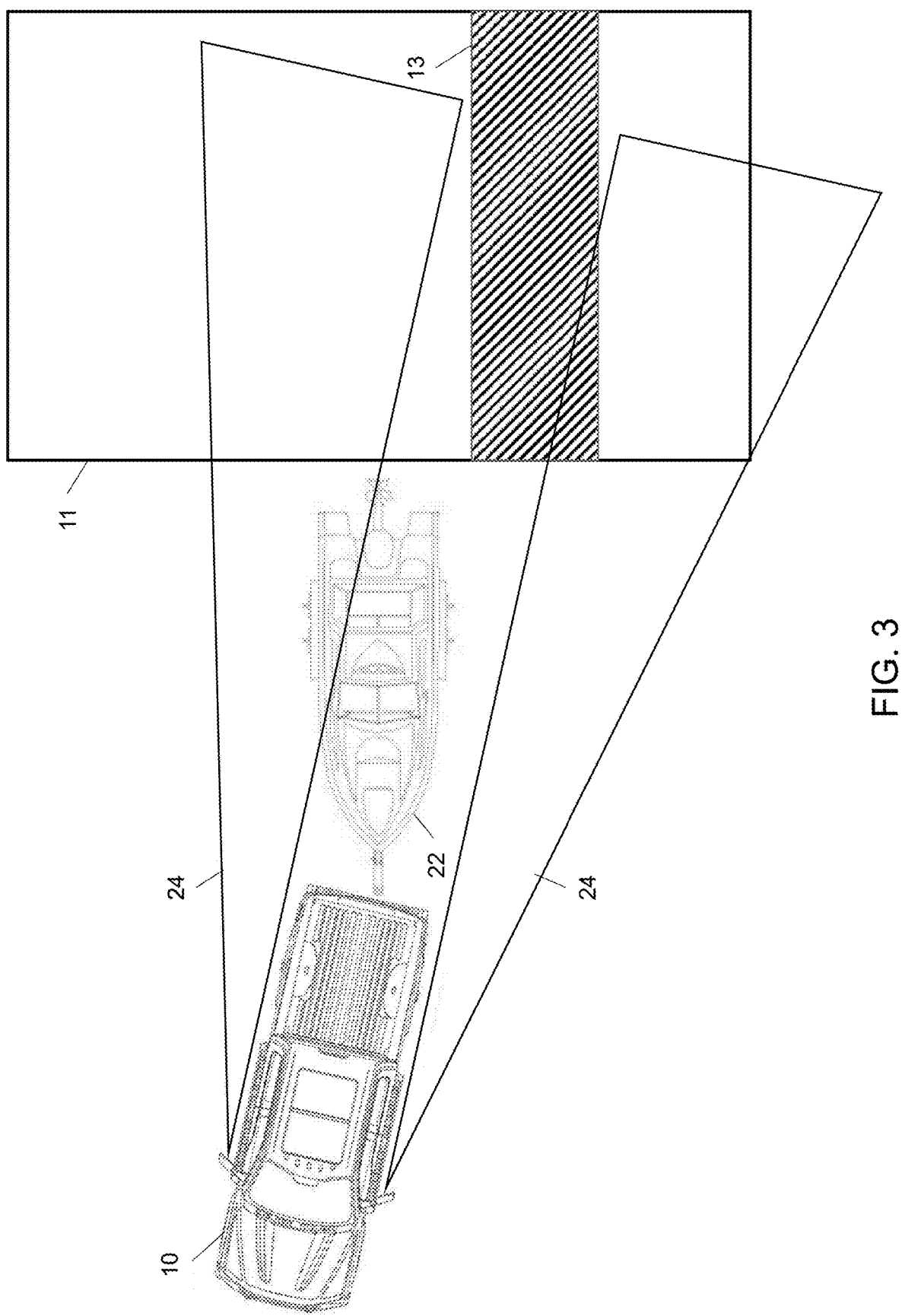
FIG. 3 shows a blind-reversing maneuver with the vehicle and trailer and with the trailer not axially aligned with the vehicle and with sideward fields of view provided to the driver by the exterior rearview mirrors and/or side viewing cameras.

FIG. 3 depicts the sideward fields of view 24 when the vehicle 10 and trailer 22 are not aligned and the driver is performing a reversing maneuver (i.e., blind-side backing or reversing) with only the sideward fields of view 24. As shown, the sideward fields of view 24 do not include the portions of the dock 13 closest to the trailer 22 and thus the driver in this situation cannot see the dock 13 to line up the trailer 22.

Figure 4:
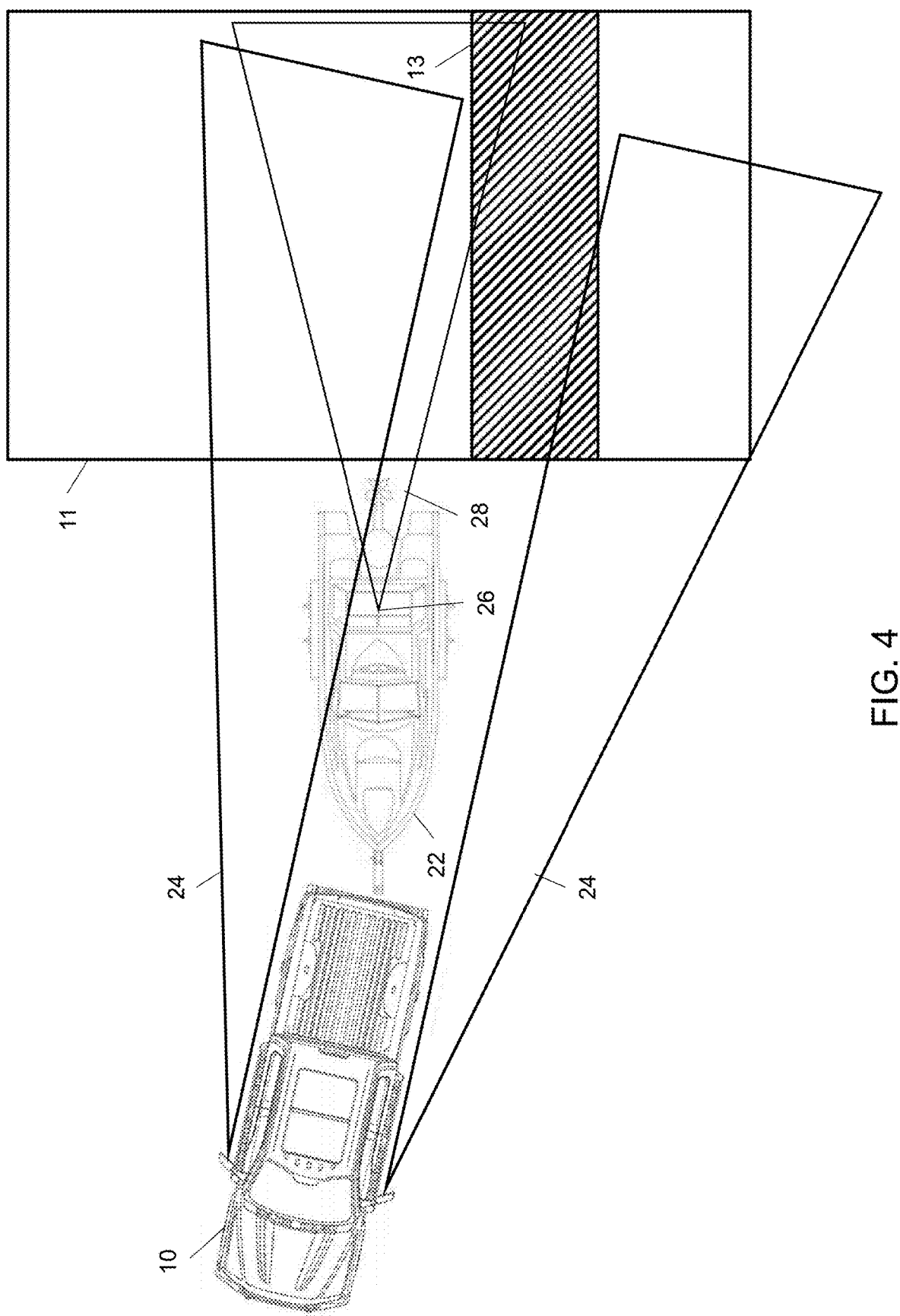
FIG. 4 shows the blind-reversing maneuver of the vehicle with the trailer not axially aligned with the vehicle and with sideward fields of view provided to the driver by the exterior rearview mirrors and/or side viewing cameras and a rearward field of view provided to the driver by a trailer camera disposed at the trailer.

As shown in FIG. 4, the system 12 communicates (such as via wireless communication or via a wired link) with a rearward-viewing trailer camera 26 disposed at a rear of the trailer 22. The rearward-viewing trailer camera 26 is disposed at the trailer 22, such as at a rear portion or the back end of the trailer 22, with the trailer camera 26 centrally located at the rear portion and having a field of view 28 at least rearward (and downward) of the trailer 22. Images captured by the trailer camera 26 are communicated to the vehicle system (such as via wireless communication or wired communication via the trailer wire harness or other wired connection) and are displayed, such as at the display device 16, for viewing by the driver of the vehicle 10. As discussed further below, images captured by the trailer camera 26 may be processed at the ECU 18, such as for object detection or for providing enhanced or surround views of the vehicle and trailer. As shown in FIG. 4, the trailer camera 26 has a limited rearward field of view 28, meaning that the field of view 28 does not include views or all regions around the trailer 22 (such as sideward of the trailer) that may be necessary for safely performing all driving maneuvers.

Thus, FIG. 4 depicts the combination of the sideward fields of view 24 and the trailer camera field of view 28 when the driver is performing blind-side reversing of the vehicle and trailer with the sideward fields of view 24 and the trailer camera field of view 28. As shown, the combination of the sideward fields of view 24 and the trailer camera field of view 28 still do not include the portions of the dock 13 closest to the trailer 22 and thus the driver, cannot see the distance between the trailer 22 and the dock 13 by using the sideward fields of view 24 and the trailer camera field of view 28. The side regions of the trailer 22 are not viewable within the images displayed to the driver and the driver is unable to judge proximity of the trailer to the dock 13 (or other obstacle) along the side of the trailer 22.

Figure 5:
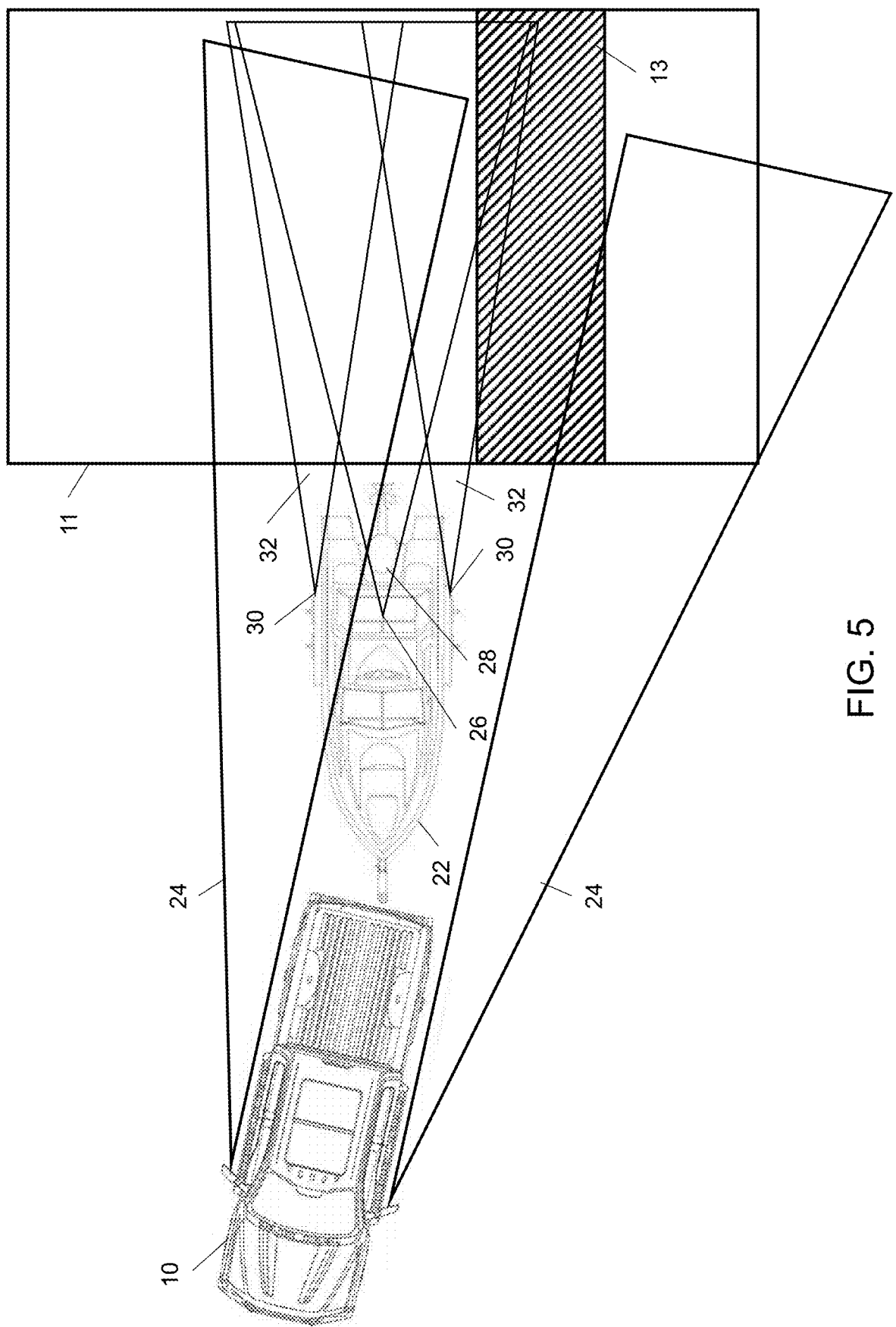
FIGS. 5 and 6 show the blind-reversing maneuver with sideward fields of view provided to the driver by the exterior rearview mirrors and/or side viewing cameras, the rearward field of view provided to the driver by the trailer camera, and sideward and rearward fields of view provided to the driver by attachable cameras disposed at respective sides of the trailer.
Figure 6:
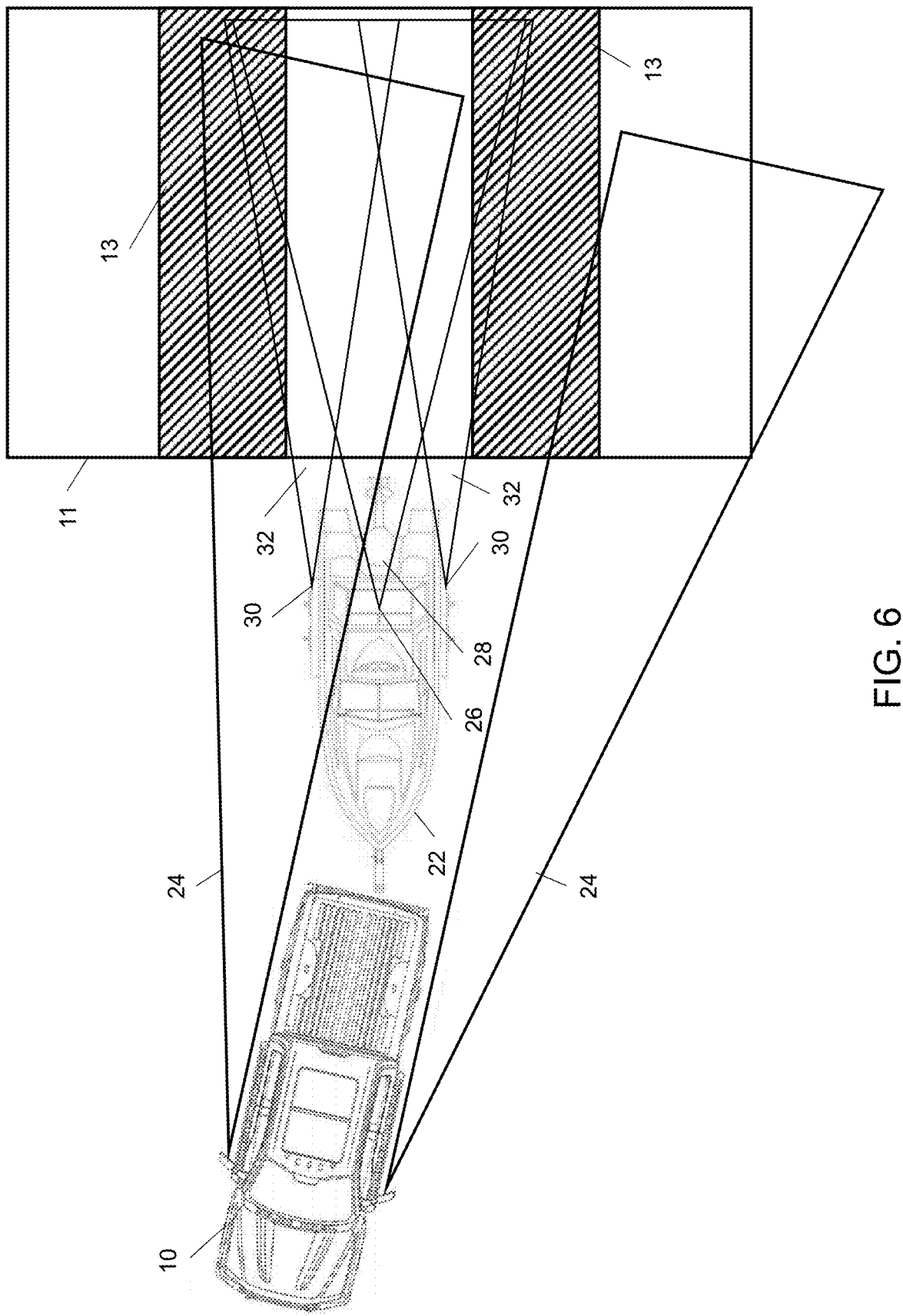

As shown in FIGS. 5 and 6, detachably attachable or movable or portable or supplementary or auxiliary cameras 30 may be disposed along respective sides of the trailer 22, such as at the fenders of the trailer, to assist with backing the boat trailer 22 along the ramp. The attachable cameras 30 communicate with the system 12 (such as via wireless communication or via a wired link) to provide images captured by the attachable cameras 30 for viewing by the driver of the vehicle 10, such as at the display device 16. The attachable cameras 30 provide respective fields of view 32 and the attachable cameras 30 may be selectably detachably attached in any suitable position within communicable range of the system 12. In the illustrated example, the attachable cameras 30 are positioned at respective fenders at the sides of the trailer 22 to provide respective fields of view 32 rearward of the trailer and along the sides of the trailer. The fields of view 32 of the attachable cameras 30 may include regions around the vehicle 10 and/or trailer 22 that are not already included in a field of view of another camera, thereby increasing or enhancing the total field of view provided to the driver of the vehicle. Thus, when the driver is performing blind-side reversing of the vehicle 10 and trailer 22 while viewing images representative of the attachable camera fields of view 32 (and optionally viewing images representative of the sideward fields of view 24 and trailer camera field of view 28), the driver can see the dock and can discern the distance between the trailer 22 and the dock 13 as well as the alignment of the trailer 22 with the ramp 11 and/or dock 13.

The system 12 may communicate with and receive images from one or more attachable cameras 30. The driver may position one attachable camera 30 as needed (such as at the side of the trailer at which the dock will align) or the driver may position multiple cameras 30 to provide multiple distinct views. For example, attachable cameras 30 may be positioned at each side of the trailer 22 to view obstacles 13 (e.g., docks at a boat launch ramp) along both sides of the trailer 22 (FIG. 6).

Figure 7:
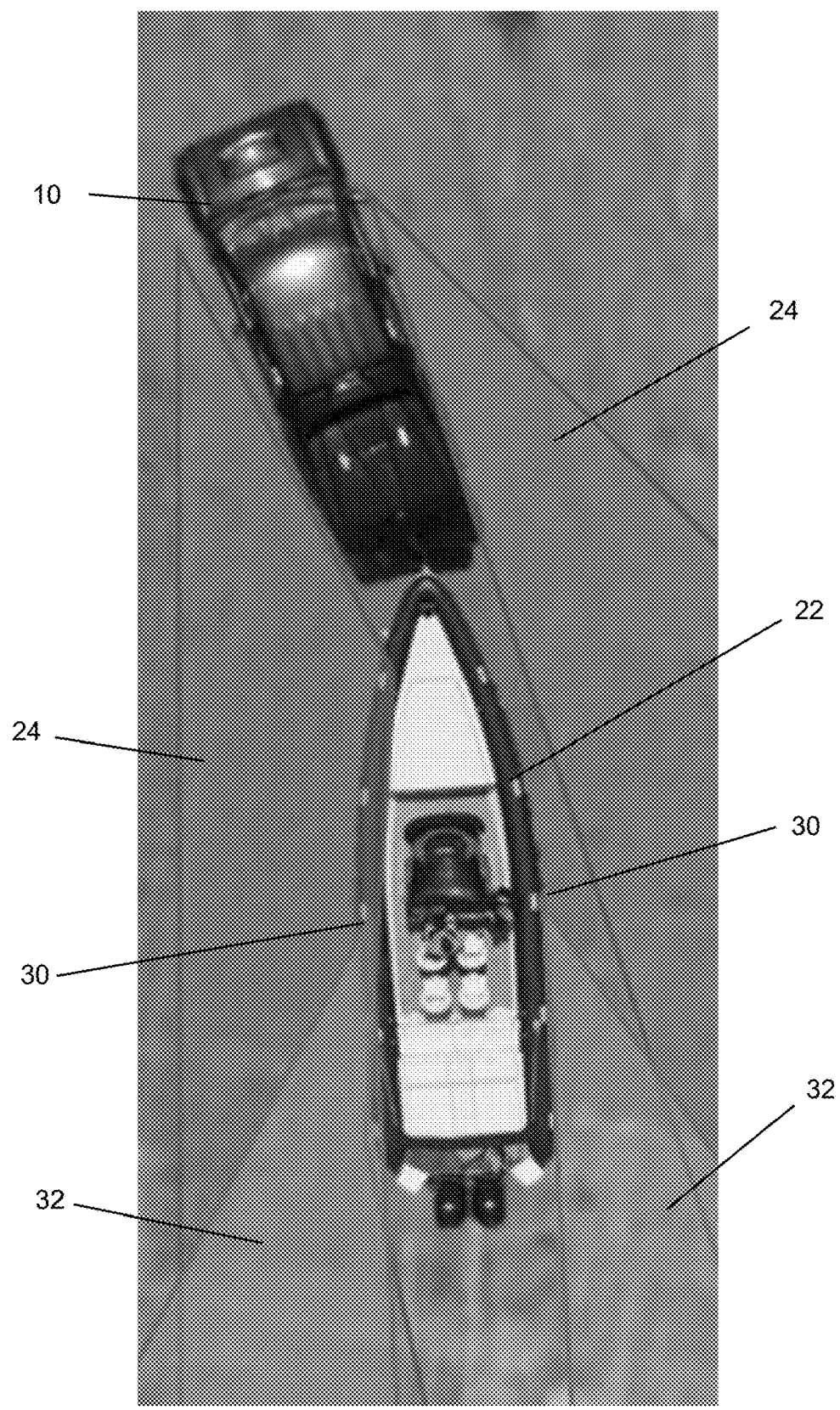
FIG. 7 shows the blind-reversing maneuver with sideward fields of view provided to the driver by the exterior rearview mirrors and/or side viewing cameras, and sideward and rearward fields of view provided to the driver by attachable cameras disposed at respective sides of the trailer.
Figure 8:
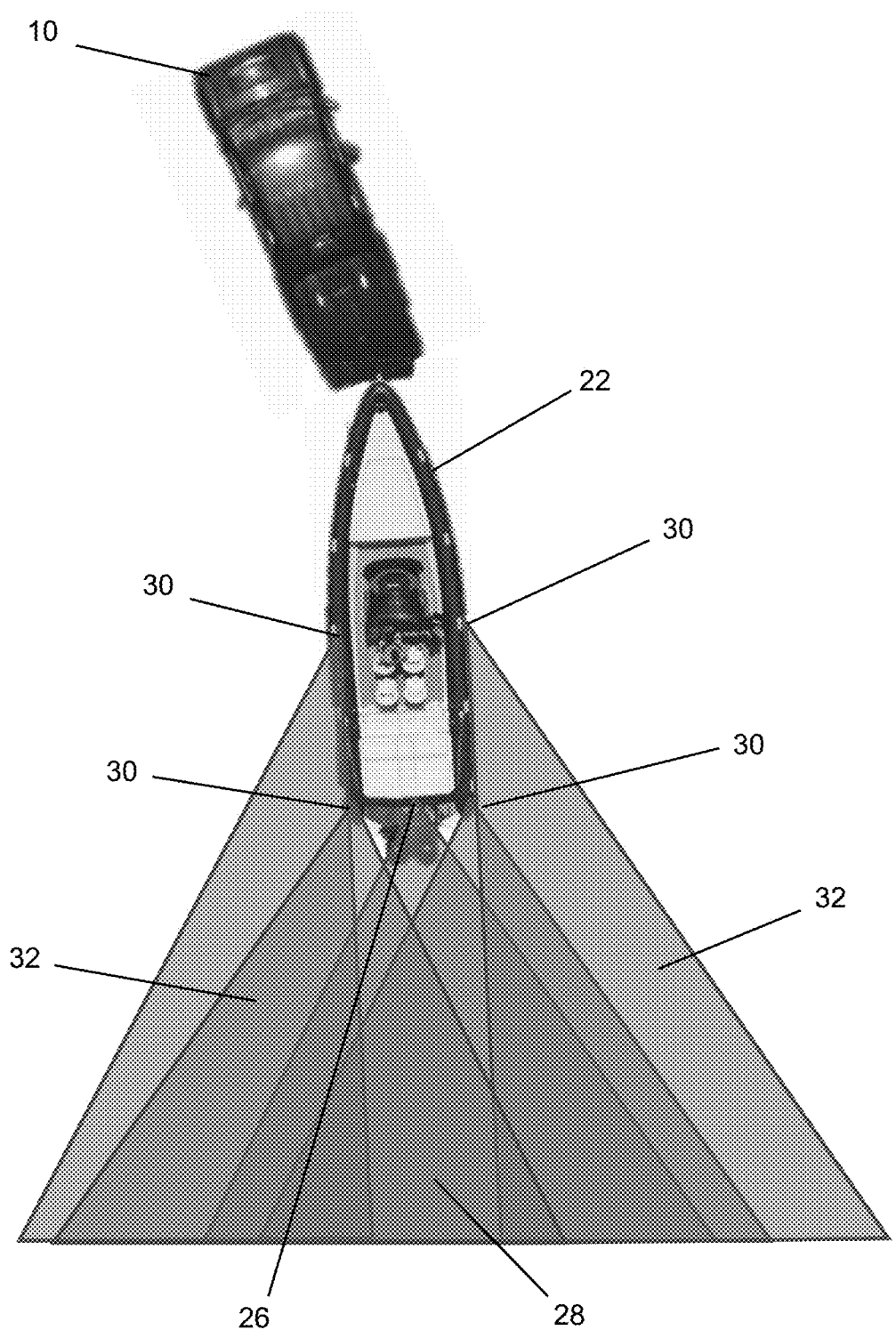
FIG. 8 shows the blind-reversing maneuver with sideward and rearward fields of view provided to the driver by multiple attachable cameras disposed at each respective side of the trailer.

Optionally, attachable cameras 30 may be disposed along the side of the trailer 22 so that the respective fields of view 32 of the attachable cameras 30 and the sideward fields of view 24 of the sideviewing cameras and/or exterior rearview mirrors at least partially overlap. For example, and such as shown in FIG. 7, attachable cameras 30 are disposed (such as detachably attached at the trailer, such as via a magnetic attachment or fastener attachment or hook and loop fastening means or the like) along respective sides of the trailer 22 at a central portion of the trailer 22 (whereas the cameras in FIGS. 5 and 6 may be at a rear portion or region of the trailer) so that there is greater overlap between the fields of view 32 of the attachable cameras 30 and the sideward fields of view 24. Moreover, and as shown in FIG. 8, multiple attachable cameras 30 may be disposed along the same respective side of the trailer 22 and/or vehicle 10 to have overlapping fields of view, such that one set of attachable cameras 30 may be disposed at the rear portion or region of the trailer 22 and another set of attachable cameras 30 may be disposed at the central region or portion of the trailer 22.

Optionally, the one or more attachable cameras 30 may be disposed at positions of the vehicle 10 and having fields of view exterior of the vehicle, such as along a roofline of the vehicle and viewing forward or rearward of the vehicle or along a bed rail of a truck bed of the vehicle and viewing rearward (and optionally along a respective side) of the vehicle.

The system may selectively display images from one or more of the attachable cameras 30. For example, the system may display images from attachable cameras having a wider field of view 32 (e.g., the attachable cameras at the central portion of the trailer) when no obstacle is detected in close proximity to the trailer, and the system may display images from attachable cameras 30 having a specific field of view (e.g., one or more of the attachable cameras at the rear portion of the trailer) when an obstacle is detected in the field of view of the camera or in close proximity to a location corresponding to the attachable camera 30.

Figure 9:
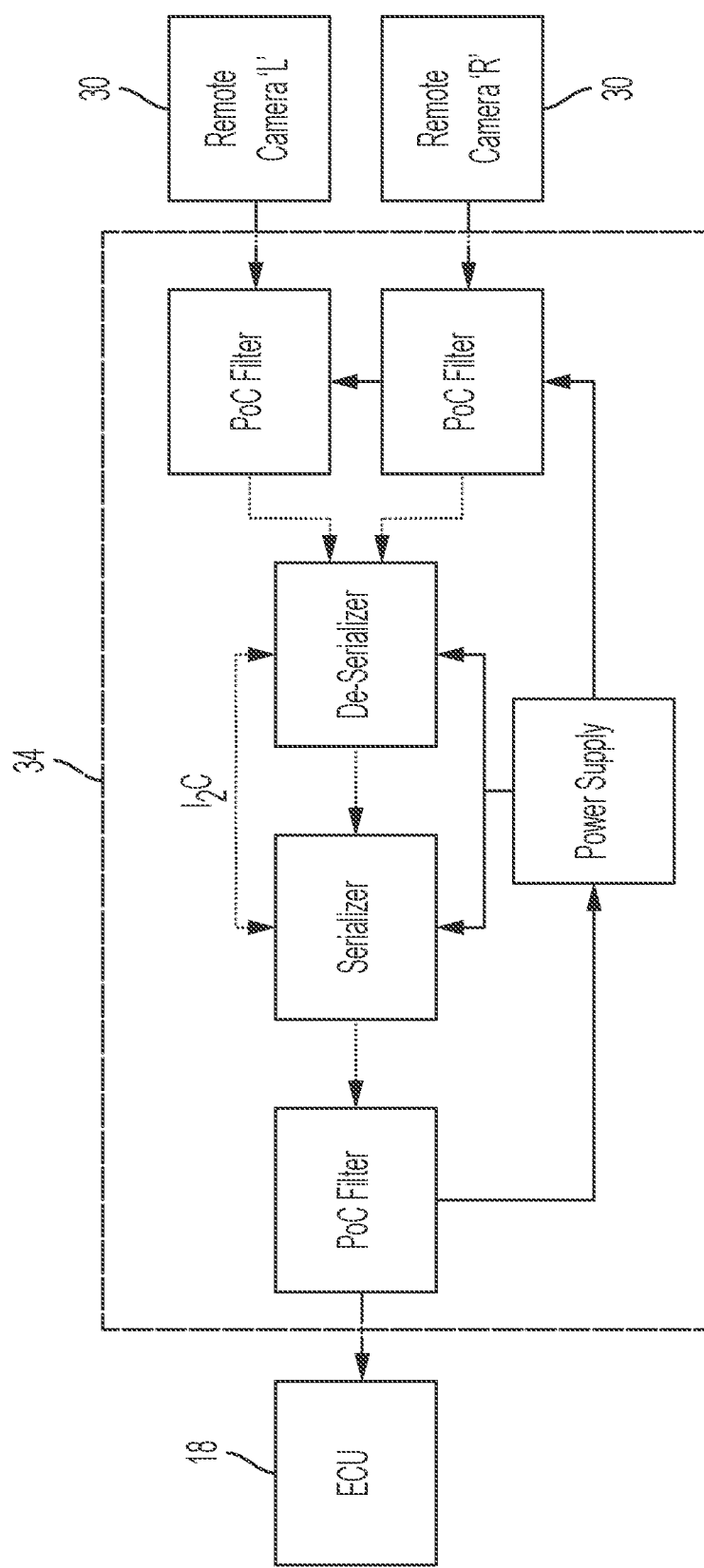
FIG. 9 is a schematic of a multiplexer configured to transmit image data captured by the attachable cameras to the electronic control unit at the vehicle.

As shown in FIG. 9, the system 12 may include a multiplexer (MUX) 34 for communicating captured image data from the plurality of attachable cameras 30 to the ECU 18. The MUX requires an additional FAKRA connector and power over coax (PoC) filter and uses an I2C link to select which one or more attachable cameras 30 is connected to the system. For example, the MUX 34 may receive image data captured by a plurality of attachable cameras 30 disposed at the trailer 22 and/or vehicle 10 and the MUX 34 provides the captured image data from one of the plurality of attachable cameras, or a subset of the plurality of attachable cameras, for display of video images derived from the captured image data to the driver of the vehicle. For example, the MUX 34 may provide the captured image data from a particular subset of the attachable cameras 30 based on a signal from the ECU 18, such as based on a user input requesting a view or based on detection of an object in a field of view of the cameras. Thus, the MUX 34 and ECU 18 augment the image data captured from other vision systems (e.g., the CMS) of the equipped vehicle with the image data captured by the one or more attachable cameras 30 disposed at the trailer 22 and/or vehicle 10 to display images for viewing by the driver, such as in difficult driving situations where more complete video images are needed, like backing a trailer around a blind corner.

In other words, the remote camera may be more useful mounted closer to the side of the trailer, to better show alignment of the trailer to the nearby dock. It may also be more useful placed further forward, to reference the trailer frame (i.e., include at least a portion of the trailer in the field of view). Two cameras may be included to allow for docks on each side of the trailer. Thus, the system may place one or more cameras on the sides of the trailer to provide trailer-referenced view for alignment of the trailer while reversing.

Thus, the attachable cameras 30 provide additional images for viewing by a driver of the vehicle to assist in maneuvering the vehicle (and optionally trailer) in difficult-to-maneuver situations, such as during blind-side reversing of the vehicle and trailer, or to ensure the trailer does not come into contact with obstacles such as docks, garages, landscaping, etc.

The attachable cameras 30 may be selectably attached at any position of the vehicle 10 or trailer 22 hitched to the vehicle. The attachable cameras 30 may be self-mountable, meaning that the attachable camera 30 comprises a mounting portion for attaching to a surface of the vehicle 10 or trailer 22. For example, the mounting portion may include a suction cup, vice clamp, magnetic element, or any suitable fastener. Optionally, the attachable cameras 30 may be received at mounting elements attached at the vehicle or trailer such that the attachable camera 30 mounts to the vehicle or trailer when received at the mounting element.

Images provided by the one or more attachable cameras 30 may be viewed by the driver of the vehicle at any suitable display device within the vehicle, such as at the interior rearview mirror display, center stack display, at display devices disposed at the mirror reflective elements of the exterior rearview mirror assembly, or at a mobile device. Video images derived from the images or image data captured by the attachable cameras 30 may be provided for display to the driver of the vehicle at the display device 16 for viewing with the video images from the one or more vehicle cameras 14, 15 and/or the trailer camera 26. Optionally, the images from the attachable cameras may be viewable at a separate and distinct display device from the display screen that displays the images derived from outputs of the vehicle cameras and trailer camera. For example, the images captured by the vehicle cameras and/or trailer camera may be provided at the center console display device, while the images captured by the attachable cameras may be provided at the interior rearview mirror display device. The images may be transmitted directly to the display, such as via BLUETOOTH® or other wireless or wired communication means, or the images may be received at the ECU 18 and transmitted to the display via the ECU 18 at the vehicle 10.

Optionally, the images provided by the one or more attachable cameras 30 may be viewed by the driver at a mobile device, such as a smart phone, tablet computer, or the like. The system may provide the images from the attachable camera 30 at the mobile device while providing other images (such as from the trailer camera 26) at the display device 16 of the vehicle 10. Thus, the driver of the vehicle may view a first set of images from one or more cameras of the vehicle and/or trailer at the display device 16 of the vehicle and the driver may view a second set of images from the attachable cameras 30 at a second display device such as the mobile device. This may allow the driver to more easily view and manipulate (e.g., zoom in/out, pan, switch between images from multiple attachable cameras) the images from the attachable cameras. The mobile device may provide an interface for interacting with the attachable cameras such as via a mobile application. For example, via use of the mobile application at the mobile device, the driver may view the images and provide commands to the attachable cameras 30, such as instruct the attachable cameras to power on/off or begin capturing image data. Optionally, the attachable cameras 30 may be configured to adjust their respective field of view responsive to user inputs, such as to pan or zoom or pivot, such as responsive to a user input at the user's smart phone or the like. The image data captured by the attachable cameras 30 may be transmitted (e.g., wirelessly, such as via a short range communication protocol, such as BLUETOOTH®) directly to the mobile device or the image data may be transmitted to a remote server in communication with the attachable cameras 30. The image data may be processed at the remote server to provide video images derived from the captured image data to the mobile device. Thus, the image data captured by the attachable cameras 30 may not be processed at the ECU 18 of the vehicle.

The images from the attachable cameras 30 may be provided automatically (such as responsive to the cameras 30 being disposed at the vehicle or trailer) or the attachable cameras 30 may provide images responsive to a user actuatable input, such as a button or actuatable input disposed in the interior cabin of the vehicle. The images from the two side attachable cameras may be displayed as a split screen display (optionally with a demarcation between the two images). Optionally, images derived from an output of one of the attachable trailer cameras may be displayed or enlarged or highlighted responsive to determination that the trailer is approaching or within a threshold distance of the obstacle or dock to alert the driver of a potential misalignment of the trailer at the ramp and dock.

The attachable cameras 30 may receive power from the vehicle, such as connected to a power source of the vehicle via the wiring harness of the vehicle or via a power outlet at the trailer connected to the wiring harness of the vehicle, or the attachable cameras 30 may include a power supply, such as a rechargeable battery. Optionally, the attachable camera may include means for regenerating power stored at the power supply, such as a solar panel or mechanical energy harvesting system. Thus, the attachable cameras 30 may be self-contained units for disposal at the trailer or vehicle or any position within communicable range of the system.

Optionally, the system 12 may include a trailering assist function that is operable to assist in maneuvering (such as backing up or reversing) the vehicle 10 with the trailer 22 hitched to the vehicle 10. The ECU 18 may receive image data captured by the rear trailer camera 26 (and optionally other trailer cameras if the trailer has sideward-viewing or other rearward-viewing or interior-viewing cameras). The ECU 18, via processing of the received image data captured by the rear trailer camera 26, may detect objects or the like and/or may generate a video image output to display video images of the scene rearward of the trailer 22 at the display 16 for viewing by the driver of the vehicle 10. Optionally, the system 12 may include or communicate with multiple trailer cameras (such as sideward-viewing cameras and a forward-viewing camera) to provide a surround view display of areas around the trailer 22 as well as the vehicle 10, such as by utilizing aspects of the systems described in U.S. Publication No. US-2021-0094473, which is hereby incorporated herein by reference in its entirety. The system thus may display a 360 degree bird's eye view or surround view of the surroundings of the towing vehicle 10 and the trailer 22 being towed by the vehicle.

The system 12 may provide the trailering assist function without use of the images captured by the attachable cameras 30. In other words, the trailering assist function may provide images to the driver of the vehicle and the images captured by the attachable cameras 30 may be provided to the driver separate from the trailer assist images. For example, the images captured by the attachable cameras 30 may be provided to the driver at separate displays or at the same display and distinctly separated from the images provided by the trailering assist function, such as picture in picture.

Optionally, the system 12 may provide the trailering assist function using the images captured by the attachable cameras 30. Thus, image data captured by the attachable cameras 30 may be processed at the ECU 18 for detecting objects near the vehicle and/or for providing enhanced or surround view display.

The trailer assist system or trailer surround view display system may utilize aspects of the systems described in U.S. Pat. Nos. 9,446,713; 9,085,261 and/or 6,690,268, and/or U.S. Publication Nos. US-2020-0017143; US-2019-0297233; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0217372; US-2017-0050672; US-2015-0217693; US-2014-0160276; US-2014-0085472 and/or US-2015-0002670, which are all hereby incorporated herein by reference in their entireties.

The one or more cameras or sensors may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array of any of the cameras (including the vehicle cameras, the trailer camera or cameras, and/or the auxiliary camera or cameras) may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-0005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2022-0189052; US-2022-0028111; US-2022-0027644; US-2022-0024391; US-2021-0170947; US-2021-0170820; US-2021-0078634; US-2020-0406967; US-2020-0361397; US-2020-0356788; US-2020-0334475; US-2020-0017143; US-2019-0347825; US-2019-0118860; US-2019-0064831; US-2018-0276838; US-2018-0215382; US-2017-0254873; US-2017-0217372 and/or US-2015-0002670, and/or International Publication No. WO 2021/0127693, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 10,442,360 and/or 10,046,706, and/or U.S. Publication Nos. US-2021-0245662; US-2021-0162926; US-2021-0155167 and/or US-2019-0118717, and/or International Publication No. WO 2022/150826, which are all hereby incorporated herein by reference in their entireties.

The vision system includes a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Optionally, the display may be viewable through a reflective element of a mirror assembly when the display is activated to display information. Optionally, the display element may comprise any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like.

The display device may be disposed at or incorporated in an interior mirror assembly, and the interior mirror assembly may comprise a dual-mode interior rearview video mirror that can switch from a traditional reflection mode to a live-video display mode, such as by utilizing aspects of the mirror assemblies and systems described in U.S. Pat. Nos. 11,465,561; 10,442,360; 10,421,404; 10,166,924 and/or 10,046,706, and/or U.S. Publication Nos. US-2021-0245662; US-2021-0162926; US-2021-0155167; US-2021-0094473; US-2020-0377022; US-2019-0258131; US-2019-0146297; US-2019-0118717; US-2019-0047475 and/or US-2017-0355312, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a plurality of vehicle cameras disposed at a vehicle equipped with the vehicular vision system;
   wherein the plurality of vehicle cameras comprises (i) a rearward-viewing vehicle camera viewing at least rearward of the equipped vehicle, (ii) a left-side vehicle camera disposed at a left side of the equipped vehicle and viewing at least rearward and sideward of the equipped vehicle along the left side of the equipped vehicle, and (iii) a right-side vehicle camera disposed at a right side of the equipped vehicle and viewing at least rearward and sideward of the equipped vehicle along the right side of the equipped vehicle;
   a trailer camera disposed at a rear portion of a trailer and viewing at least rearward of the trailer;
   a video display screen disposed at the equipped vehicle and viewable by a driver of the equipped vehicle;
   an electronic control unit (ECU) disposed at the equipped vehicle and comprising electronic circuitry and associated software;
   wherein the plurality of vehicle cameras captures image data, and wherein image data captured by the plurality of vehicle cameras is provided to the ECU;
   wherein, with the trailer hitched to the equipped vehicle, the trailer camera captures image data, and wherein image data captured by the trailer camera is provided to the ECU;
   wherein the electronic circuitry of the ECU comprises an image processor for processing image data provided to the ECU;
   an auxiliary camera that is detachably attached at an exterior side portion of the trailer;
   wherein, with the auxiliary camera detachably attached at the exterior side portion of the trailer, the auxiliary camera views at least rearward of the trailer, the auxiliary camera having a field of view that is different from a field of view of the trailer camera;
   wherein, during a reversing maneuver of the equipped vehicle with the trailer hitched to the equipped vehicle, video images are displayed at the video display screen, and wherein the displayed video images are derived from image data provided to the ECU from at least one selected from the group consisting of (i) the trailer camera and (ii) at least one vehicle camera of the plurality of vehicle cameras; and
   wherein, with the auxiliary camera detachably attached at the exterior side portion of the trailer during the reversing maneuver of the equipped vehicle with the trailer hitched to the equipped vehicle, and responsive to a user input, video images derived at least in part from image data captured by the auxiliary camera detachably attached at the exterior side portion of the trailer are displayed for viewing by the driver of the equipped vehicle.

2. The vehicular vision system of claim 1, wherein, with the auxiliary camera detachably attached at the exterior side portion of the trailer, the auxiliary camera views at least rearward of the trailer along a side of the trailer.

3. The vehicular vision system of claim 1, wherein, with the auxiliary camera detachably attached at the exterior side portion of the trailer, at least a portion of the field of view of the auxiliary camera does not overlap with the field of view of the trailer camera.

4. The vehicular vision system of claim 1, wherein, with the auxiliary camera detachably attached at the exterior side portion of the trailer, the video images derived at least in part from image data captured by the auxiliary camera are displayed for viewing by the driver of the equipped vehicle discernible and discrete from the video images derived from image data provided to the ECU from at least one selected from the group consisting of (i) the trailer camera and (ii) at least one vehicle camera of the plurality of vehicle cameras.

5. The vehicular vision system of claim 4, wherein the video images derived at least in part from image data captured by the auxiliary camera are displayed at a second video display screen of the equipped vehicle that is different than the video display screen that displays the video images derived from image data provided to the ECU from at least one selected from the group consisting of (i) the trailer camera and (ii) at least one vehicle camera of the plurality of vehicle cameras.

6. The vehicular vision system of claim 5, wherein the video display screen comprises a center console video display screen, and wherein the second video display screen comprises an interior rearview mirror video display screen.

7. The vehicular vision system of claim 4, wherein the video images derived at least in part from image data captured by the auxiliary camera are displayed for viewing by the driver of the equipped vehicle at a mobile device.

8. The vehicular vision system of claim 7, wherein the mobile device comprises a smart phone.

9. The vehicular vision system of claim 7, wherein the video images derived at least in part from image data captured by the auxiliary camera are displayed via a mobile app of the mobile device.

10. The vehicular vision system of claim 7, wherein image data captured by the auxiliary camera is provided to a remote server, and wherein the remote server communicates with the mobile device.

11. The vehicular vision system of claim 10, wherein image data captured by the auxiliary camera is processed at the remote server to communicate the video images derived at least in part from image data captured by the auxiliary camera to the mobile device.

12. The vehicular vision system of claim 1, wherein, with the auxiliary camera detachably attached at the exterior side portion of the trailer and with the trailer hitched to the equipped vehicle, image data captured by the auxiliary camera detachably attached at the exterior side portion of the trailer is provided to the ECU.

13. The vehicular vision system of claim 1, wherein, with the auxiliary camera detachably attached at the exterior side portion of the trailer and with the trailer hitched to the equipped vehicle, image data captured by the auxiliary camera is not processed at the ECU.

14. The vehicular vision system of claim 1, comprising a plurality of auxiliary cameras, and wherein the auxiliary camera is part of the plurality of auxiliary cameras, and wherein each auxiliary camera of the plurality of auxiliary cameras is detachably attached at a respective exterior side portion of the trailer.

15. The vehicular vision system of claim 14, wherein a first auxiliary camera of the plurality of auxiliary cameras is disposed at a first side portion of the trailer and views at least rearward of the trailer along a first side of the trailer, and wherein a second auxiliary camera of the plurality of auxiliary cameras is disposed at a second side portion of the trailer and views at least rearward of the trailer along a second side of the trailer opposite from the first side.

16. The vehicular vision system of claim 14, wherein image data captured by the plurality of auxiliary cameras is provided to a multiplexer circuit, and wherein the multiplexer circuit is operable to provide image data captured by a plurality of subsets of the plurality of auxiliary cameras for selective display of video images derived from the image data captured by a respective subset of the plurality of subsets of the plurality of auxiliary cameras.

17. The vehicular vision system of claim 16, wherein the multiplexer circuit provides the image data captured by the respective subset of the plurality of auxiliary cameras responsive to a user input.

18. The vehicular vision system of claim 16, wherein the respective subset of the plurality of auxiliary cameras comprises one auxiliary camera of the plurality of auxiliary cameras.

19. The vehicular vision system of claim 16, wherein the multiplexer circuit provides image data captured by a first subset of the plurality of auxiliary cameras responsive to a first input and the multiplexer circuit provides image data captured by a second subset of the plurality of auxiliary cameras responsive to a second input, and wherein the first input is different than the second input, and wherein the first subset of the plurality of auxiliary cameras is different than the second subset of the plurality of auxiliary cameras.

20. The vehicular vision system of claim 19, wherein the first input comprises a signal indicative of detection of an object in a field of view of the first subset of the plurality of auxiliary cameras.

21. The vehicular vision system of claim 20, wherein the second input comprises a signal indicative of actuation of a user input by the driver of the equipped vehicle.

22. A vehicular vision system, the vehicular vision system comprising:

a plurality of vehicle cameras disposed at a vehicle equipped with the vehicular vision system;

wherein the plurality of vehicle cameras comprises (i) a rearward-viewing vehicle camera viewing at least rearward of the equipped vehicle, (ii) a left-side vehicle camera disposed at a left side of the equipped vehicle and viewing at least rearward and sideward of the equipped vehicle along the left side of the equipped vehicle, and (iii) a right-side vehicle camera disposed at a right side of the equipped vehicle and viewing at least rearward and sideward of the equipped vehicle along the right side of the equipped vehicle;

a trailer camera disposed at a rear portion of a trailer and viewing at least rearward of the trailer;

a video display screen disposed at the equipped vehicle and viewable by a driver of the equipped vehicle;

an electronic control unit (ECU) disposed at the equipped vehicle and comprising electronic circuitry and associated software;

wherein the plurality of vehicle cameras captures image data, and wherein image data captured by the plurality of vehicle cameras is provided to the ECU;

wherein, with the trailer hitched to the equipped vehicle, the trailer camera captures image data, and wherein image data captured by the trailer camera is provided to the ECU;

wherein the electronic circuitry of the ECU comprises an image processor for processing image data provided to the ECU;

an auxiliary camera that is detachably attached at an exterior side portion of the trailer;

wherein, with the auxiliary camera detachably attached at the exterior side portion of the trailer, the auxiliary camera views at least rearward of the trailer along a side of the trailer, the auxiliary camera having a field of view that is different from a field of view of the trailer camera;

wherein, with the auxiliary camera detachably attached at the exterior side portion of the trailer and with the trailer hitched to the equipped vehicle, image data captured by the auxiliary camera detachably attached at the exterior side portion of the trailer is provided to the ECU;

wherein, during a reversing maneuver of the equipped vehicle with the trailer hitched to the equipped vehicle, video images are displayed at the video display screen, and wherein the displayed video images are derived from image data provided to the ECU from at least one selected from the group consisting of (i) the trailer camera and (ii) at least one vehicle camera of the plurality of vehicle cameras;

wherein, with the auxiliary camera detachably attached at the exterior side portion of the trailer during the reversing maneuver of the equipped vehicle with the trailer hitched to the equipped vehicle, and responsive to a user input, video images derived at least in part from image data captured by the auxiliary camera detachably attached at the exterior side portion of the trailer are displayed for viewing by the driver of the equipped vehicle; and wherein, with the auxiliary camera detachably attached at the exterior side portion of the trailer, the video images derived at least in part from image data captured by the auxiliary camera are displayed for viewing by the driver of the equipped vehicle discernible and discrete from the video images derived from image data provided to the ECU from at least one selected from the group consisting of (i) the trailer camera and (ii) at least one vehicle camera of the plurality of vehicle cameras.

23. The vehicular vision system of claim 22, wherein the video images derived at least in part from image data captured by the auxiliary camera are displayed at a second video display screen of the equipped vehicle that is different than the video display screen that displays the video images derived from image data provided to the ECU from at least one selected from the group consisting of (i) the trailer camera and (ii) at least one vehicle camera of the plurality of vehicle cameras.

24. The vehicular vision system of claim 22, wherein the video images derived at least in part from image data captured by the auxiliary camera are displayed for viewing by the driver of the equipped vehicle at a mobile device.

25. A vehicular vision system, the vehicular vision system comprising:

a plurality of vehicle cameras disposed at a vehicle equipped with the vehicular vision system;

wherein the plurality of vehicle cameras comprises (i) a rearward-viewing vehicle camera viewing at least rearward of the equipped vehicle, (ii) a left-side vehicle camera disposed at a left side of the equipped vehicle and viewing at least rearward and sideward of the equipped vehicle along the left side of the equipped vehicle, and (iii) a right-side vehicle camera disposed at a right side of the equipped vehicle and viewing at least rearward and sideward of the equipped vehicle along the right side of the equipped vehicle;

a trailer camera disposed at a rear portion of a trailer and viewing at least rearward of the trailer;

a video display screen disposed at the equipped vehicle and viewable by a driver of the equipped vehicle;

an electronic control unit (ECU) disposed at the equipped vehicle and comprising electronic circuitry and associated software;

wherein the plurality of vehicle cameras captures image data, and wherein image data captured by the plurality of vehicle cameras is provided to the ECU;

wherein, with the trailer hitched to the equipped vehicle, the trailer camera captures image data, and wherein image data captured by the trailer camera is provided to the ECU;

wherein the electronic circuitry of the ECU comprises an image processor for processing image data provided to the ECU;

a plurality of auxiliary cameras, wherein each auxiliary camera of the plurality of auxiliary cameras is detachably attached at a respective exterior side portion of the trailer;

wherein, with the plurality of auxiliary cameras detachably attached at the respective exterior side portions of the trailer, each auxiliary camera of the plurality of auxiliary cameras views at least rearward of the trailer, each auxiliary camera of the plurality of auxiliary cameras having a respective field of view that is different from a field of view of the trailer camera;

wherein, with the plurality of auxiliary cameras detachably attached at the respective exterior side portions of the trailer and with the trailer hitched to the equipped vehicle, image data captured by the plurality of auxiliary cameras detachably attached at the respective exterior side portions of the trailer is provided to the ECU;

wherein image data captured by the plurality of auxiliary cameras is provided to a multiplexer circuit, and wherein the multiplexer circuit is operable to provide image data captured by a plurality of subsets of the plurality of auxiliary cameras for selective display of video images derived from the image data captured by a respective subset of the plurality of subsets of the plurality of auxiliary cameras;

wherein the multiplexer circuit provides the image data captured by the respective subset of the plurality of auxiliary cameras responsive to a user input;

wherein, during a reversing maneuver of the equipped vehicle with the trailer hitched to the equipped vehicle, video images are displayed at the video display screen, and wherein the displayed video images are derived from image data provided to the ECU from at least one selected from the group consisting of (i) the trailer camera and (ii) at least one vehicle camera of the plurality of vehicle cameras; and wherein, with the plurality of auxiliary cameras detachably attached at the respective exterior side portions of the trailer during the reversing maneuver of the equipped vehicle with the trailer hitched to the equipped vehicle, and responsive to the user input, video images derived at least in part from image data captured by the respective subset of the plurality of subsets of the plurality of auxiliary cameras are displayed for viewing by the driver of the equipped vehicle.

26. The vehicular vision system of claim 25, wherein, with the plurality of auxiliary cameras detachably attached at the respective exterior side portions of the trailer, the video images derived at least in part from image data captured by the respective subset of the plurality of subsets of the plurality of auxiliary cameras are displayed for viewing by the driver of the equipped vehicle discernible and discrete from the video images derived from image data provided to the ECU from at least one selected from the group consisting of (i) the trailer camera and (ii) at least one vehicle camera of the plurality of vehicle cameras.

27. The vehicular vision system of claim 25, wherein a first auxiliary camera of the plurality of auxiliary cameras is disposed at a first side portion of the trailer and views at least rearward of the trailer along a first side of the trailer, and wherein a second auxiliary camera of the plurality of auxiliary cameras is disposed at a second side portion of the trailer and views at least rearward of the trailer along a second side of the trailer opposite from the first side.

28. The vehicular vision system of claim 25, wherein the respective subset of the plurality of auxiliary cameras comprises one auxiliary camera of the plurality of auxiliary cameras.

\* \* \* \* \*

UNITED STATES PATENT AND TRADEMARK OFFICE
CERTIFICATE OF CORRECTION

| | | |
|---|---|---|
| PATENT NO. | : 12,115,918 B2 | Page 1 of 1 |
| APPLICATION NO. | : 18/161189 | |
| DATED | : October 15, 2024 | |
| INVENTOR(S) | : Eric Peterson | |

It is certified that error appears in the above-identified patent and that said Letters Patent is hereby corrected as shown below:

In the Claims

<u>Column 12</u>
Line 61, Claim 4, "cam eras." Should be --cameras.--

<u>Column 13</u>
Lines 66-67, Claim 18, "cam eras." Should be --cameras.--

<u>Column 17</u>
Lines 3-4, Claim 28, "cam eras." Should be --cameras.--

Signed and Sealed this
Twelfth Day of November, 2024

*Katherine Kelly Vidal*

Katherine Kelly Vidal
*Director of the United States Patent and Trademark Office*